(No Model.)
W. H. GRAHAM.
GAS FURNACE.
No. 339,876. Patented Apr. 13, 1886.
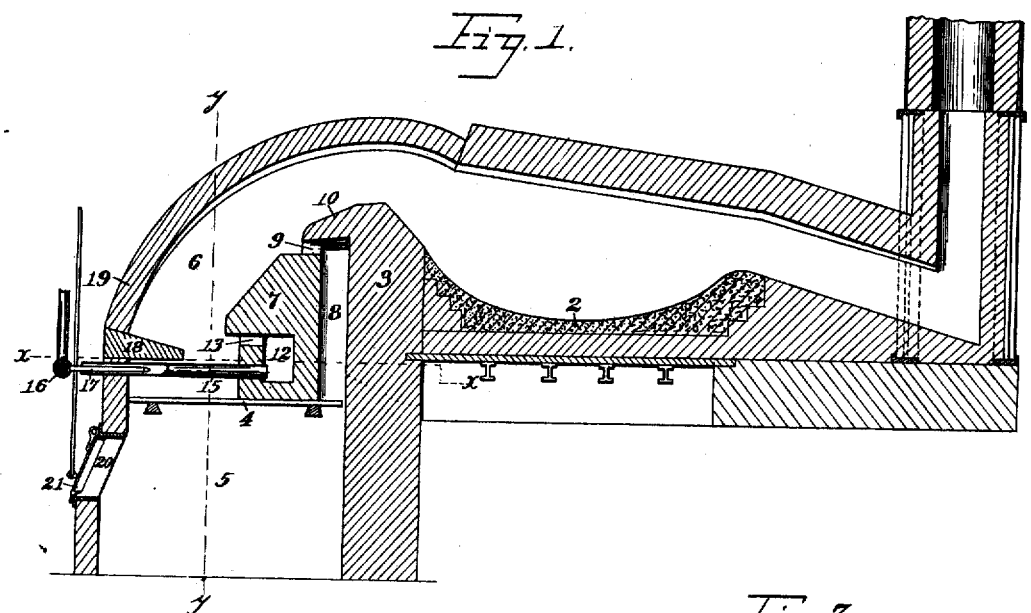
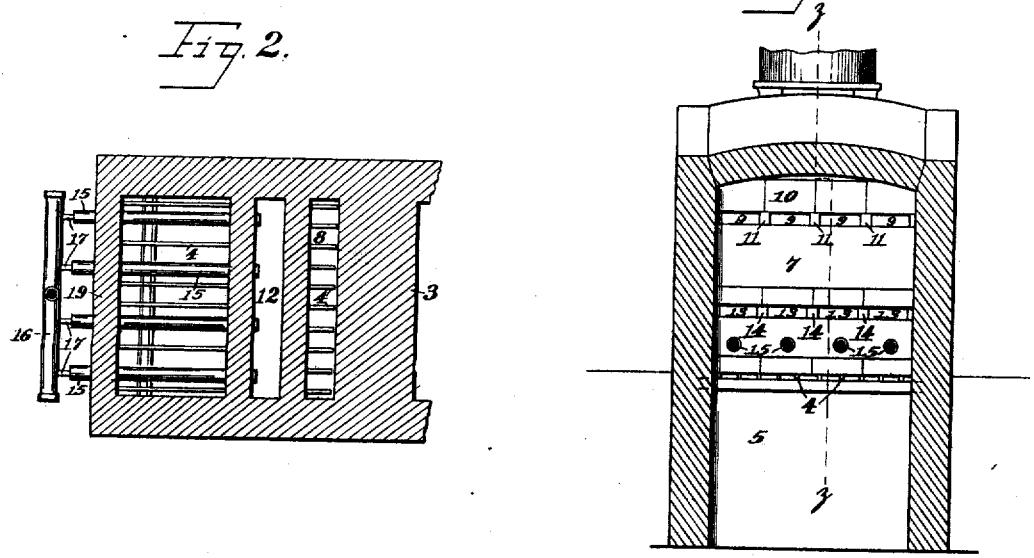
Witnesses.
W. B. Corwin
J. A. Burns.
Inventor.
William H. Graham
by Bakewell & Kerr
his Attorneys

UNITED STATES PATENT OFFICE.

WILLIAM H. GRAHAM, OF PITTSBURG, PENNSYLVANIA.

GAS-FURNACE.

SPECIFICATION forming part of Letters Patent No. 339,876, dated April 13, 1886.

Application filed November 11, 1885. Serial No. 182,410. (No model.)

*To all whom it may concern:*

Be it known that I, WILLIAM H. GRAHAM, of Pittsburg, in the county of Allegheny and State of Pennsylvania, have invented a new and useful Improvement in Gas-Furnaces; and I do hereby declare the following to be a full, clear, and exact description thereof, reference being had to the accompanying drawings, forming part of this specification, in which—

Figure 1 is a vertical longitudinal section of a puddling-furnace built in accordance with the principles of my invention. Fig. 2 is a horizontal cross-section on the line $x\,x$ of Fig. 1. Fig. 3 is a vertical cross-section on the line $y\,y$ of Fig. 1, the latter being a section on the line $z\,z$ of Fig. 3.

Like symbols of reference indicate like parts in each.

Many efforts have been made, in the adaptation of metallurgical furnaces to the use of natural gas as a fuel, to secure the best conditions to produce proper combustion and the maximum of heat. In puddling-furnaces the best conditions are achieved when the furnace is arranged to mix the air and gases most thoroughly before combustion is completed and before they have reached the hearth or working-chamber. If this is not done, the gas will pass into the hearth only partially consumed, will leave a dense and hard deposit of carbon on the walls of the furnace, and on reaching the stack and having then become thoroughly mixed will create a vivid combustion there, which is apt to burn and destroy the masonry. There are two ways of obviating this evil: either by superheating the air used in combustion, or by providing means for the thorough admixture of the air with the gas and for the introduction of the air to the gas at the proper point. The latter mode is preferable, because it requires a simpler and cheaper construction, and for several other reasons. The heating of the air is objectionable, since it causes the gas to make a hard deposit of carbon in the furnace.

Referring to the drawings, 2 represents the hearth of a puddling-furnace, which is of ordinary construction, and 3 is the fire-wall, which separates the hearth from the combustion-chamber. 4 are the grate-bars, built into the furnace-walls over the chamber 5, which corresponds in position to the ordinary ash-pit; and above the bars 4 is a combustion-chamber, 6, which has its adit into the furnace-hearth over the bridge-wall 3. A wall, 7, is built upon the bars 4, across the combustion-chamber, parallel with the bridge-wall 3, but separated therefrom sufficiently to provide a vertical intervening flue, 8, which leads from the chamber 5 nearly to the summit of the bridge-wall, where it opens by a horizontal neck-flue, 9, into the combustion-chamber 6. As shown in the drawings, this flue 9 is constituted by a horizontal tile, 10, which projects over the top of the wall 7 and is supported by bricks 11. (Shown in Fig. 3.) Within the wall 7, near the base, is a transverse pocket or chamber, 12, which preferably extends across the entire width of the combustion-chamber and communicates with the latter through a horizontal connecting-flue, 13. The partitions 14, shown Fig. 3 as intersecting the flue 13, are brick supports designed to strengthen the wall 7. Any suitable number of air-pipes or flues, 15, are set in the chamber with their outer ends projecting through the front wall, 19, into the air in front of the furnace, and with their inner ends opening into the chamber 12. The gas is supplied to the furnace by a T-burner, 16, having jet-pipes 17, which project loosely into the mouths of the several air-pipes 15. A tile, 18, projects horizontally from the front wall of the combustion-chamber into the latter over the pipes 15, and extends preferably about one-half of the distance between the front wall and the wall 7. The purpose of this tile is to act as a deflector for the air-current, as will be explained hereinafter. Air is admitted to the chamber 5 through a port, 20, which may be opened or closed by the door 21 to the desired limits.

Thus constructed, the operation of the furnace is as follows: Gas, having been admitted to the T-burner 16, will rush through the jet-pipes 17 into the open pipes 15, and will induce a current of air into the latter through their open outer ends. The result of this induction of air will be to mix the air and gas within the pipes 15, and on their entrance into the mixing-chamber 12 they will expand, and, in expanding, will mix even more thoroughly. The gas is ignited within the combustion-chamber at its exit from the flue 13, and passes in a state of combustion over the top of the bridge-wall into the furnace-hearth. As the gas emerges from the flue 13, it meets an incoming current of air which rises from the chamber 5 between the bars 4 and between the pipes 15. Thus re-enforced combustion is aided and its activity increased. The function of the transverse wall or tile 18 is to intercept that portion of the rising air-current which is near to the front furnace wall, and to deflect it and center it upon the outcoming gas from the flue 13. When the burning fuel reaches the summit of the bridge-wall 3, it is still further re-enforced by a sheet of air which comes from the chamber 5 up through the flue 8, and into the combustion-chamber through the transverse flue 9. The latter supply of air will complete the combustion so perfectly that the gas will be entirely consumed before it passes the furnace-hearth and reaches the stack.

In practice of my invention it will be found that the combustion in the chamber 6 occurs mostly at the inner side next to the wall 7. As a consequence the front wall and crown of the furnace may be made of little thickness. About one-half of the ordinary thickness of wall will suffice. This is a material advantage, and greatly reduces the cost and labor of furnace-building.

As will be apparent to a skilled furnace-builder, my improvement may be easily applied to any of the ordinary coal-burning furnaces. In fact, I have shown in the drawings such a furnace modified according to the principles of my invention. It is for this reason that the grate-bars 4 have been shown in the form in which they ordinarily exist, though they may be replaced by any other devices which will serve the same purpose of upholding the wall 7, and will provide a flue for the passage of a re-enforcing current of air into the combustion-chamber.

What I claim as my invention, and desire to secure by Letters Patent, is—

1. In a gas-furnace, the combination of a combustion-chamber, a mixing-chamber, 12, situate at the rear thereof and opening into the combustion-chamber toward the front wall, and a gas and air flue discharging into the mixing-chamber, substantially as and for the purposes described.

2. In a gas-furnace, the combination of a combustion-chamber, a mixing-chamber, 12, situate at the rear thereof and opening into the combustion-chamber toward the front wall thereof, an air pipe or flue, 15, discharging into the mixing-chamber, and a gas-pipe projecting into the air-pipe for the purpose of discharging a supply of gas mingled with an induced current of air into the mixing-chamber, substantially as and for the purposes described.

3. In a gas-furnace, the combination of a combustion-chamber, a mixing-chamber, 12, situate at the rear thereof and opening into the combustion-chamber toward the front wall, a gas and air flue discharging into the mixing-chamber, and a second air-flue discharging into the combustion-chamber below the exit of the mixing-chamber, substantially as and for the purposes described.

4. In a gas-furnace, the combination of a combustion-chamber, a mixing-chamber, 12, situate near the base and at the rear side of the combustion-chamber and communicating therewith, gas and air flues discharging into the mixing-chamber, and a rising air-flue, 8, situate in the wall of the furnace back of the mixing-chamber and discharging into the combustion-chamber above the exit of the mixing-chamber, substantially as and for the purposes described.

5. In a gas-furnace, the combination of a combustion-chamber, a gas and air flue opening into the rear of the combustion-chamber and discharging toward the front wall thereof, a second air-flue discharging into the combustion-chamber below the adit of said air and gas flue, and a deflecting tile or wall, 18, projecting within the combustion-chamber from the front wall and arranged in the path of the current from said second air-flue, for the purpose of deflecting said current toward the exit of the air and gas flue, substantially as described.

In testimony whereof I have hereunto set my hand this 3d day of November, A. D. 1885.

WILLIAM H. GRAHAM.

Witnesses:
W. B. CORWIN,
THOMAS W. BAKEWELL.